US012053028B2

(12) United States Patent
Jang et al.

(10) Patent No.: US 12,053,028 B2
(45) Date of Patent: Aug. 6, 2024

(54) METHOD OF CONTROLLING TEMPERATURE OF HEATER OF AEROSOL GENERATING DEVICE AND THE AEROSOL GENERATING DEVICE

(71) Applicant: KT&G CORPORATION, Daejeon (KR)

(72) Inventors: Yong Joon Jang, Daejeon (KR); Gyoung Min Go, Daejeon (KR); Jang Won Seo, Daejeon (KR); Chul Ho Jang, Daejeon (KR); Min Seok Jeong, Seoul (KR); Jong Seong Jeong, Sejong (KR); Jin Chul Jung, Daejeon (KR)

(73) Assignee: KT&G CORPORATION, Daejeon (KR)

( * ) Notice: Subject to any disclaimer, the term of this patent is extended or adjusted under 35 U.S.C. 154(b) by 739 days.

(21) Appl. No.: 17/266,167

(22) PCT Filed: Jun. 25, 2020

(86) PCT No.: PCT/KR2020/008286
§ 371 (c)(1),
(2) Date: Feb. 5, 2021

(87) PCT Pub. No.: WO2020/262984
PCT Pub. Date: Dec. 30, 2020

(65) Prior Publication Data

US 2021/0307407 A1 Oct. 7, 2021

(30) Foreign Application Priority Data

Jun. 27, 2019 (KR) ........................ 10-2019-0077252

(51) Int. Cl.
*A24F 40/57* (2020.01)
*A24F 40/20* (2020.01)
(Continued)

(52) U.S. Cl.
CPC .............. *A24F 40/57* (2020.01); *A24F 40/20* (2020.01); *H05B 1/0297* (2013.01); *A24F 40/46* (2020.01); *A24F 40/465* (2020.01)

(58) Field of Classification Search
CPC .......... A24F 40/57; A24F 40/20; A24F 40/46; A24F 40/465; H05B 1/0297
(Continued)

(56) References Cited

U.S. PATENT DOCUMENTS 9,067,029 B2 6/2015 Yamada et al.
9,498,000 B2 * 11/2016 Kuczaj .................... A24F 40/57
(Continued)

FOREIGN PATENT DOCUMENTS

CN 108618207 A 10/2018
CN 208192124 U 12/2018
(Continued)

OTHER PUBLICATIONS

International Search Report of PCT/KR2020/008286 dated Oct. 8, 2020 [PCT/ISA/210].
(Continued)

*Primary Examiner* — Gary F Paumen
(74) *Attorney, Agent, or Firm* — Sughrue Mion, PLLC

(57) ABSTRACT

As an embodiment of the present disclosure, there is disclosed an aerosol generating device including: a heater configured to generate an aerosol by heating an aerosol generating substrate; a storage unit configured to store information regarding a first time period and a second time period for controlling a temperature of the heater; and a controller configured to control power supplied to the heater, wherein the controller, when the first time period time elapses after the temperature of the heater reaches the first target temperature, changes the temperature of the heater to a second target temperature for the second time period, and
(Continued)

the sum of the first time period and the second time period is a time period in a preset change.

15 Claims, 9 Drawing Sheets

(51) Int. Cl.

| | |
|---|---|
| ***A24F 40/46*** | (2020.01) |
| ***A24F 40/465*** | (2020.01) |
| ***H05B 1/02*** | (2006.01) |

(58) Field of Classification Search

USPC .......................................................... 131/328

See application file for complete search history.

(56) References Cited

U.S. PATENT DOCUMENTS

| | | | | |
|---|---|---|---|---|
| 9,668,521 | B2 * | 6/2017 | Kuczaj | H05B 1/0225 |
| 9,713,345 | B2 | 7/2017 | Farine et al. | |
| 10,470,496 | B2 | 11/2019 | Bernauer et al. | |
| 10,624,393 | B2 * | 4/2020 | Kuczaj | H05B 1/0244 |
| 10,721,967 | B2 * | 7/2020 | Raichman | A24F 40/40 |
| 11,457,661 | B2 | 10/2022 | Han et al. | |
| 11,523,639 | B2 * | 12/2022 | Kuczaj | H05B 1/0244 |
| 11,617,395 | B2 * | 4/2023 | Farine | A24F 40/30 131/328 |
| 11,666,099 | B2 * | 6/2023 | Kuczaj | H05B 1/0225 219/492 |
| 11,707,089 | B2 * | 7/2023 | Raichman | A61P 43/00 392/386 |
| 11,717,027 | B2 * | 8/2023 | Raichman | A24F 40/46 392/386 |
| 11,717,028 | B2 * | 8/2023 | Raichman | A61K 31/05 514/454 |
| 2018/0084608 | A1 | 3/2018 | Bernauer et al. | |
| 2018/0104214 | A1 | 4/2018 | Raichman | |
| 2019/0216136 | A1 | 7/2019 | Capuano | |

FOREIGN PATENT DOCUMENTS

| | | | |
|---|---|---|---|
| EP | 2879533 | | 6/2015 |
| KR | 10-2009-0023742 | A | 3/2009 |
| KR | 10-2014-0063506 | A | 5/2014 |
| KR | 10-2015-0084779 | A | 7/2015 |
| KR | 10-2015-0097820 | A | 8/2015 |
| KR | 10-1660214 | B1 | 9/2016 |
| KR | 10-2017-0137066 | A | 12/2017 |
| KR | 10-2019-0051785 | A | 5/2019 |
| WO | 2014/102091 | A1 | 7/2014 |
| WO | 2018/202403 | A1 | 11/2018 |
| WO | 2019/005526 | A1 | 1/2019 |
| WO | 2019/105879 | A1 | 6/2019 |

OTHER PUBLICATIONS

Communication dated Mar. 30, 2023, issued in Chinese Application No. 202080005768.1.

Extended European Search Report issued Dec. 17, 2021 in European Application No. 20781426.0.

Office Action issued Dec. 7, 2021 in Japanese Application No. 2020-548635.

Japanese Office Action dated Jan. 31, 2023 in Japanese Application No. 2020-548635.

* cited by examiner

METHOD OF CONTROLLING TEMPERATURE OF HEATER OF AEROSOL GENERATING DEVICE AND THE AEROSOL GENERATING DEVICE

CROSS REFERENCE TO RELATED APPLICATIONS

This application is a National Stage of International Application No. PCT/KR2020/008286, filed Jun. 25, 2020, claiming priority to Korean Patent Application No. 10-2019-0077252, filed Jun. 27, 2019.

TECHNICAL FIELD

The present disclosure relates to a method of controlling a temperature of a heater of an aerosol generating device and the aerosol generating device, and more particularly, to a method of controlling a temperature of a heater of an aerosol generating device and the aerosol generating device capable of providing high smoking satisfaction to a user by controlling the temperature of the heater of the aerosol generating device with specificity according to time and regardless of the number of puffs by the user.

BACKGROUND ART

Recently, there has been increasing demand for alternative ways of overcoming the disadvantages of common cigarettes. For example, there is an increasing demand for a method of generating aerosol by heating an aerosol generating material in cigarettes, rather than by burning cigarettes. Accordingly, research into a heating-type cigarette or a heating-type aerosol generator has been actively conducted.

As various materials in addition to an aerosol generating substrate are heated by the heater of the aerosol generating device, according to changes in methods of heating the heater, the expression of smoking satisfaction may be significantly different depending on heated materials.

Aerosol generating devices in the related art tend to comprehensively change temperatures of heaters by counting the number of puffs by a user or have heater heating periods set as short periods compared to smoking times of common users. In the above-described cases, shortcomings pointed out are as follows: power consumption of the aerosol generating device is excessively high, or particle generation is insufficient due to limitation of generation of particles eluted in a solid phase or warmth of aerosol is insufficient, due to a cooling effect of the heater by repeated smoking for a short period of time.

DESCRIPTION OF EMBODIMENTS

Technical Problem

The present disclosure provides consistent and plentiful smoking satisfaction to user by constantly controlling a temperature of a heater of an aerosol generating device regardless of the number of puffs by a user.

Solution to Problem

To achieve the technical goal, a device according to an embodiment of the present disclosure includes; a heater configured to generate an aerosol by heating an aerosol generating substrate; a storage unit configured to store information regarding a first time period and a second time period for controlling a temperature of the heater; a controller configured to control power supplied to the heater, wherein the controller, when the first time period passes after the temperature of the heater reaches the first target temperature, changes the temperature of the heater to a second target temperature and maintains the second target temperature for the second time period, and a sum of the first time period and the second time period is a time period in a preset range.

To achieve the technical goal, a method according to an embodiment of the present disclosure includes: a first heating process of heating a heater to a first target temperature; a first maintenance process of maintaining a temperature of the heated heater at the first target temperature; a temperature change process of changing the temperature of the heater to a second target temperature when the first time period passes; and a second maintenance process of maintaining the changed temperature of the heater at the second target temperature for a second time period; and a sum of the first time period and the second time period is a time period in a preset range.

An embodiment of the present disclosure may provide a computer-readable recording medium having stored a program for executing the method.

In addition, to achieve the technical goal, an aerosol generating device according to another embodiment of the present disclosure may be provided to the user.

Advantageous Effects of Disclosure

According to the present disclosure, high smoking satisfaction may be provided to a user by a temperature control method capable of increasing amount of migration off nicotine and an amount of migration of glycerin without need to consider the number of puffs by individual users.

More particularly, the present disclosure does not realize high smoking satisfaction simply by limiting a heating time to a certain time range, but by combining patterns of temperature maintenance, temperature change, and temperature maintenance to a method of properly adjusting a maintenance time, thereby providing a high stimulus from smoking and smoke volume at an early stage to a user who uses an aerosol generating device.

BEST MODE

Figure 1:
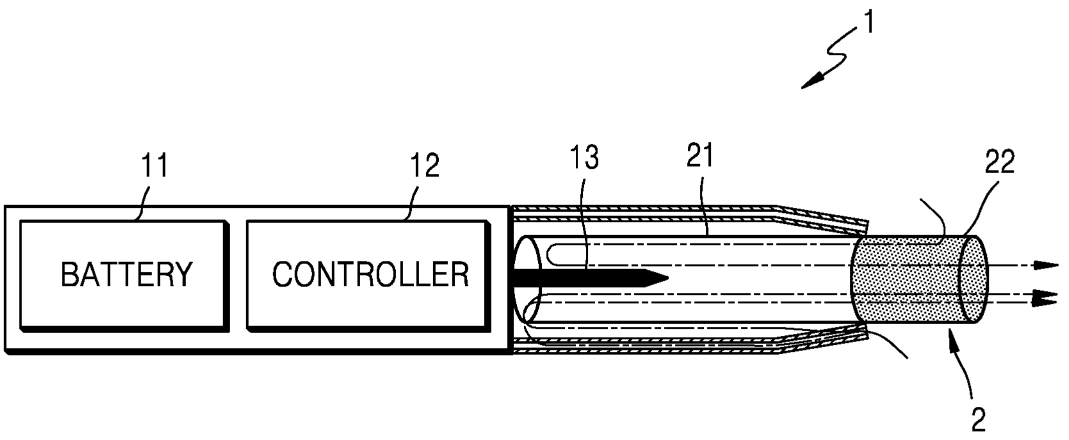
FIGS. 1 through 3 are diagrams showing examples in which a cigarette is inserted into an aerosol generating device.

To achieve the technical goal, a device according to an embodiment of the present disclosure may include: a heater configured to generate an aerosol by heating an aerosol generating substrate; a storage unit configured to store information regarding a first time period and a second time period for controlling a temperature of the heater; and a controller configured to control power supplied to the heater, wherein the controller, when the first time period passes after the temperature of the heater reaches the first target temperature, changes the temperature of the heater to a second target temperature and maintains the second target temperature for the second time period, and a sum of the first time period and the second time period is a time period in a preset range.

In the device, the sum of the first time period and the second time period may be greater than four minutes and less than five minutes.

In the device, a length of the first time period may be greater than a length of the second time period.

In the device, the length of the second time period may be greater than the length of the first time period, or the length of the second time period may be equal to the length of the first time period.

In the device, a proportion of the length of the first time period to the length of the second time period may be a constant value.

In the device, the first target temperature may be lower than the second target temperature.

In the device, the first target temperature may be equal to or higher than 315° C. and lower than or equal to 325° C., and the second target temperature may be equal to or lower than ° C. and lower than or equal to 335° C.

In the device, the first target temperature may be higher than the second target temperature.

In the device, the first target temperature may be equal to or higher than 325° C. and lower than or equal to 335° C., and the second target temperature may be equal to or higher than 310° C. and lower than or equal to 320° C.

In the device, the storage unit may further store information regarding a third time period, and the controller, when the temperature of the heater reaches the first target temperature and the first time period passes, may change the temperature of the heater into the second target temperature over the third time period and maintain the second target temperature for the second time period, and a sum of the first time period, the second time period, and the third time period is a time period in a preset range.

To achieve the technical goal, a method according to another embodiment of the present disclosure may include: a first heating process of heating the heater to a first target temperature; a first maintenance process of maintaining the temperature of the heated heater at the first target temperature for a first time period; a temperature change process of changing the temperature of the heater to a second target temperature when the first time period passes; and a second maintenance process of maintaining the changed temperature of the heater at the second target temperature for a second time period, and a sum of the first time period and the second time period is a time period in a preset change.

In the method, the sum of the first time period and the second time period may be greater than four minutes and less than five minutes.

In the method, a length of the first time period may be greater than a length of the second time period.

In the method, a proportion of the length of the first time period to the length of the second time period may be a constant value.

In the method, the first target temperature may be lower than the second target temperature.

In the method, the first target temperature may be equal to or higher than 315° C. and lower than or equal to 325° C., and the second target temperature may be equal to or higher than 325° C. and lower than or equal to 335° C.

In the method, the first target temperature may be higher than the second target temperature.

In the method, the first target temperature may be equal to or higher than 325° C. and equal to or lower than 335° C., and the second target temperature may be equal to or higher than 310° C. and lower than or equal to 320° C.

In the method, the temperature change process may include changing the temperature of the heater into the second target temperature over the third time period when the temperature of the heater reaches the first target temperature and the first time period passes.

According to an embodiment of the present disclosure, disclosed is a computer-readable recording medium having stored a program for executing the method.

MODE OF DISCLOSURE

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like.

In addition, unless explicitly described to the contrary, the word “comprise” and variations such as “comprises” or “comprising” will be understood to imply the inclusion of stated elements but not the exclusion of any other elements. In addition, the terms “-er”, “-or”, and “module” described in the specification mean units for processing at least one function and/or operation and can be implemented by hardware components or software components and combinations thereof.

The attached drawings for illustrating one or more embodiments are referred to in order to gain a sufficient understanding, the merits thereof, and the objectives accomplished by the implementation. The disclosure may, however, be embodied in many different forms and should not be construed as being limited to the embodiments set forth herein.

Hereinafter, embodiments of the present disclosure will be described in detail with reference to the drawings.

Figure 2:
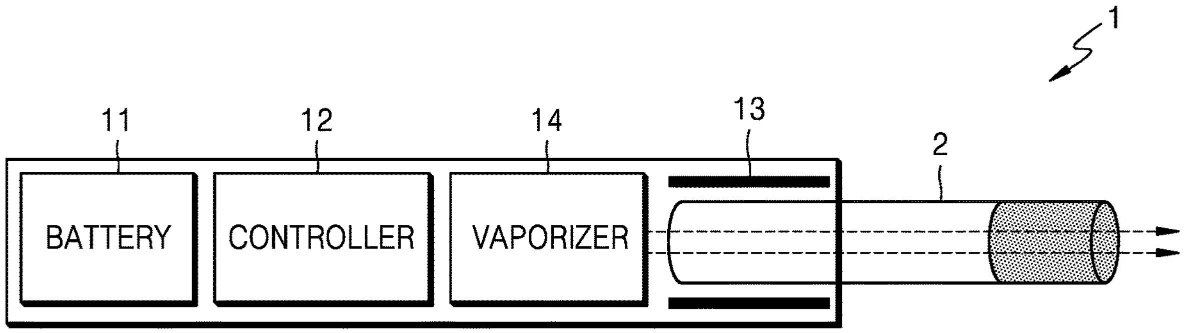
Figure 3:
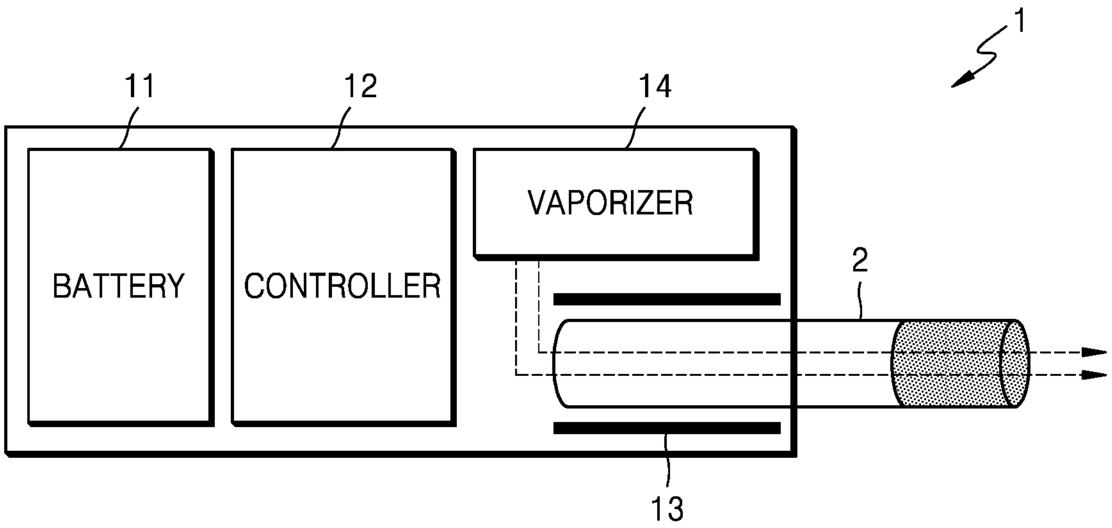

FIGS. 1 through 3 are diagrams showing examples in which a cigarette is inserted into an aerosol-generating device.

Referring to FIG. 1, an aerosol generating device 1 includes a battery 11, a controller 12, and a heater 13. Referring to FIGS. 2 and 3, the aerosol generating device 1 further includes a vaporizer 14. A cigarette 2 may be inserted into an internal space of the aerosol generating device 1.

The elements related to the embodiment are illustrated in the aerosol generator 1 of FIGS. 1 to 3. Therefore, one of ordinary skill in the art would appreciate that other universal elements than the elements shown in FIGS. 1 to 3 may be further included in the aerosol generator 1.

Also, although it is shown that the aerosol generating device 1 includes the heater 13 in FIGS. 2 and 3, the heater 13 may be omitted if necessary.

In FIG. 1, the battery 11, the controller 12, and the heater 13 are arranged in a row. Also, FIG. 2 shows that the battery 11, the controller 12, the vaporizer 14, and the heater 13 are arranged in a row. Also, FIG. 3 shows that the vaporizer 14 and the heater 13 are arranged in parallel with each other.

However, an internal structure of the aerosol generator 1 is not limited to the examples shown in FIGS. 1 to 3. That is, according to a design of the aerosol generator 1, arrangement of the battery 11, the controller 12, the heater 13, and the vaporizer 14 may be changed.

When the cigarette 2 is inserted into the aerosol generator 1, the aerosol generator 1 operates the heater 13 and/or the vaporizer 14 to generate aerosol from the cigarette 2 and/or the vaporizer 14. The aerosol generated by the heater 13 and/or the vaporizer 14 may be transferred to a user via the cigarette 2.

If necessary, even when the cigarette 2 is not inserted in the aerosol generator 1, the aerosol generator 1 may heat the heater 13.

The battery 11 supplies the electric power used to operate the aerosol generator 1. For example, the battery 11 may supply power for heating the heater 13 or the vaporizer 14 and supply power for operating the controller 12. In addition, the battery 11 may supply power for operating a display, a sensor, a motor, and the like installed in the aerosol generator 1.

The controller 12 controls the overall operation of the aerosol generator 1. In detail, the controller 12 may control operations of other elements included in the aerosol generator 1, as well as the battery 11, the heater 13, and the vaporizer 14. Also, the controller 12 may check the status of each component in the aerosol generator 1 to determine whether the aerosol generator 1 is in an operable state.

The controller 12 includes at least one processor. A processor can be implemented as an array of a plurality of logic gates or can be implemented as a combination of a general-purpose microprocessor and a memory in which a program executable in the microprocessor is stored. It will be understood by one of ordinary skill in the art that the present disclosure may be implemented in other forms of hardware.

The heater 13 may be heated by the electric power supplied from the battery 11. For example, when the cigarette is inserted in the aerosol generator 1, the heater 13 may be located outside the cigarette. Therefore, the heated heater 13 may raise the temperature of an aerosol generating material in the cigarette.

The heater 13 may be an electro-resistive heater. For example, the heater 13 includes an electrically conductive track, and the heater 13 may be heated as a current flows through the electrically conductive track. However, the heater 13 is not limited to the above example, and any type of heater may be used provided that the heater is heated to a desired temperature. Here, the desired temperature may be set in advance on the aerosol generator 1, or may be set by a user.

In addition, in another example, the heater 13 may include an induction heating type heater. In detail, the heater 13 may include an electrically conductive coil for heating the cigarette in an induction heating method, and the cigarette may include a susceptor that may be heated by the induction heating type heater.

For example, the heater 13 may include a tubular type heating element, a plate type heating element, a needle type heating element, or a rod type heating element, and may heat the inside or outside of the cigarette 2 according to the shape of the heating element.

Also, there may be a plurality of heaters 13 in the aerosol generator 1. Here, the plurality of heaters 13 may be arranged to be inserted into the cigarette 2 or on the outside of the cigarette 2. Also, some of the plurality of heaters 13 may be arranged to be inserted into the cigarette 2 and the other may be arranged on the outside of the cigarette 2. In addition, the shape of the heater 13 is not limited to the example shown in FIGS. 1 to 3, but may be manufactured in various shapes.

The vaporizer 14 may generate aerosol by heating a liquid composition and the generated aerosol may be delivered to the user after passing through the cigarette 2. In other words, the aerosol generated by the vaporizer 14 may move along an air flow passage of the aerosol generator 1, and the air flow passage may be configured for the aerosol generated by the vaporizer 14 to be delivered to the user through the cigarette.

For example, the vaporizer 14 may include a liquid storage unit, a liquid delivering unit, and a heating element, but is not limited thereto. For example, the liquid storage unit, the liquid delivering unit, and the heating element may be included in the aerosol generator 1 as independent modules.

The liquid storage may store a liquid composition. For example, the liquid composition may be a liquid including a tobacco containing material including a volatile tobacco flavor component, or a liquid including a non-tobacco material. The liquid storage unit may be attached to/detached from the vaporizer 14 or may be integrally manufactured with the vaporizer 14.

For example, the liquid composition may include water, solvents, ethanol, plant extracts, flavorings, flavoring agents, or vitamin mixtures. The flavoring may include, but is not limited to, menthol, peppermint, spearmint oil, various fruit flavoring ingredients, etc. The flavoring agent may include components that may provide the user with various flavors or tastes. Vitamin mixtures may be a mixture of at least one of vitamin A, vitamin B, vitamin C, and vitamin E, but are not limited thereto. Also, the liquid composition may include an aerosol former such as glycerin and propylene glycol.

The liquid delivery element may deliver the liquid composition of the liquid storage to the heating element. For example, the liquid delivery element may be a wick such as cotton fiber, ceramic fiber, glass fiber, or porous ceramic, but is not limited thereto.

The heating element is an element for heating the liquid composition delivered by the liquid delivering unit. For example, the heating element may be a metal heating wire, a metal hot plate, a ceramic heater, or the like, but is not limited thereto. In addition, the heating element may include a conductive filament such as nichrome wire and may be positioned as being wound around the liquid delivery element. The heating element may be heated by a current supply and may transfer heat to the liquid composition in contact with the heating element, thereby heating the liquid composition. As a result, aerosol may be generated.

For example, the vaporizer 14 may be referred to as a cartomizer or an atomizer, but is not limited thereto.

In addition, the aerosol generator 1 may further include universal elements, in addition to the battery 11, the controller 12, the heater 13, and the vaporizer 14. For example, the aerosol generator 1 may include a display capable of outputting visual information and/or a motor for outputting tactile information. In addition, the aerosol generator 1 may include at least one sensor (a puff sensor, a temperature sensor, a cigarette insertion sensor, etc.) Also, the aerosol generator 1 may be manufactured to have a structure, in which external air may be introduced or internal air may be discharged even in a state where the cigarette 2 is inserted.

Although not shown in FIGS. 1 to 3, the aerosol generator 1 may configure a system with an additional cradle. For example, the cradle may be used to charge the battery 11 of the aerosol generator 1. Alternatively, the heater 13 may be heated in a state in which the cradle and the aerosol generator 1 are coupled to each other.

The cigarette 2 may be similar to a typical burning cigarette. For example, the cigarette 2 may include a first portion containing an aerosol generating material and a second portion including a filter and the like. Alternatively, the second portion of the cigarette 2 may also include the aerosol generating material. For example, an aerosol-generating material made in the form of granules or capsules may be inserted into the second portion.

The entire first portion may be inserted into the aerosol generator 1 and the second portion may be exposed to the outside. Alternatively, only a portion of the first portion may be inserted into the aerosol generator 1 or the entire first portion and a portion of the second portion may be inserted into the aerosol generator 1. The user may puff aerosol while holding the second portion by the mouth of the user. At this time, the aerosol is generated by as the outside air passes through the first portion, and the generated aerosol passes through the second portion and is delivered to a user's mouth.

For example, the outside air may be introduced through at least one air passage formed in the aerosol generator 1. For example, the opening and closing of the air passage formed in the aerosol generator 1 and/or the size of the air passage may be adjusted by a user. Accordingly, the amount of smoke and a smoking impression may be adjusted by the user. In another example, the outside air may be introduced into the cigarette 2 through at least one hole formed in a surface of the cigarette 2.

Hereinafter, an example of the cigarette 2 will be described with reference to FIGS. 4 and 5.

Figure 4:
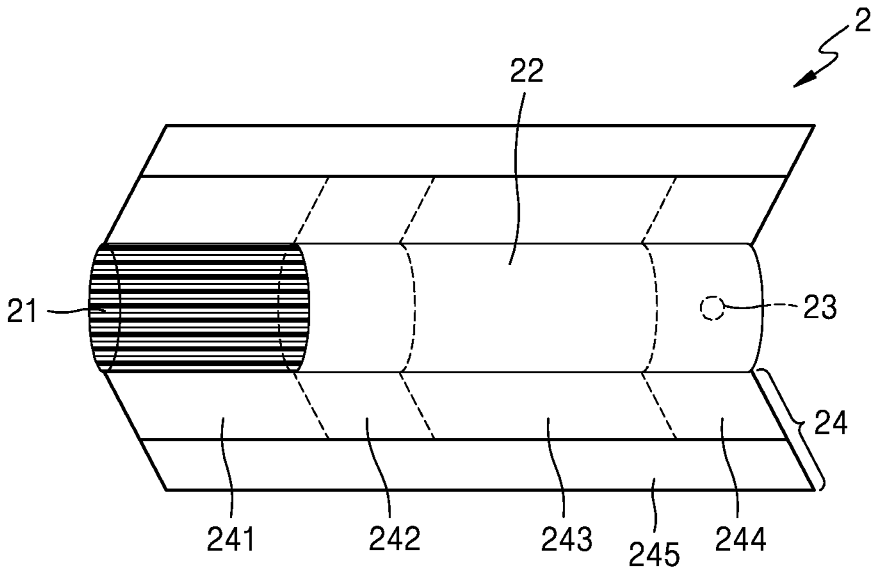
FIGS. 4 and 5 are diagrams showing examples of a cigarette.
Figure 5:
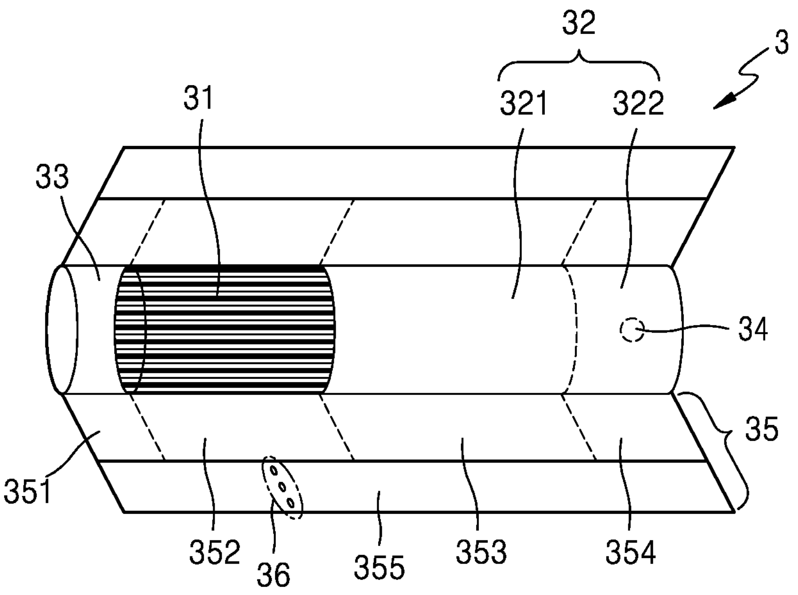

FIGS. 4 and 5 illustrate an example of a cigarette.

Referring to FIG. 4, the cigarette 2 includes a tobacco rod 21 and a filter rod 22. The first portion described above with reference to FIGS. 1 to 3 include the tobacco rod 21 and the second portion includes the filter rod 22.

In FIG. 4, the filter rod 22 is shown as a single segment, but is not limited thereto. In other words, the filter rod 22 may include a plurality of segments. For example, the filter rod 22 may include a first segment for cooling down the aerosol and a second segment for filtering a predetermined component included in the aerosol. Also, if necessary, the filter rod 22 may further include at least one segment performing another function.

The cigarette 2 may be packaged by at least one wrapper 24. The wrapper 24 may include at least one hole through which the outside air is introduced or inside air is discharged. For example, the cigarette 2 may be packaged by one wrapper 24. In another example, the cigarette 2 may be packaged by two or more wrappers 24. For example, the tobacco rod 21 may be packaged via a first wrapper 241, and the filter rod 22 may be packaged via wrappers 242 to 244. And the entire cigarette 2 may be packaged via a final wrapper 245. When the filter rod 22 includes a plurality of segments, each segment may be packaged via a separate wrapper.

The tobacco rod 21 includes an aerosol generating material. For example, the aerosol-generating material may include at least one of glycerin, propylene glycol, ethylene glycol, dipropylene glycol, diethylene glycol, triethylene glycol, tetraethylene glycol, and oleyl alcohol, but it is not limited thereto. In addition, the tobacco rod 21 may include other additive materials like a flavoring agent, a wetting agent, and/or an organic acid. Also, a flavoring liquid such as menthol, humectant, etc. may be added to the tobacco rod 21 by being sprayed to the tobacco rod 21.

The tobacco rod 21 may be manufactured variously. For example, the tobacco rod 21 may be fabricated as a sheet or a strand. Also, the tobacco rod 21 may be fabricated by tobacco leaves that are obtained by fine-cutting a tobacco sheet. Also, the tobacco rod 21 may be surrounded by a heat conducting material. For example, the heat-conducting material may be, but is not limited to, a metal foil such as aluminum foil. For example, the heat conducting material surrounding the tobacco rod 21 may improve a thermal conductivity applied to the tobacco rod by evenly dispersing the heat transferred to the tobacco rod 21, and thereby improving tobacco taste. Also, the heat conducting material surrounding the tobacco rod 21 may function as a susceptor that is heated by an inducting heating type heater. Although not shown in the drawings, the tobacco rod 21 may further include a susceptor, in addition to the heat conducting material surrounding the outside thereof.

The filter rod 22 may be a cellulose acetate filter. In addition, the filter rod 22 is not limited to a particular shape. For example, the filter rod 22 may be a cylinder type rod or a tube type rod including a cavity therein. Also, the filter rod 22 may be a recess type rod. When the filter rod 22 includes a plurality of segments, at least one of the plurality of segments may have a different shape from the others.

Also, the filter rod 22 may include at least one capsule 23. Here, the capsule 23 may generate flavor or may generate aerosol. For example, the capsule 23 may have a structure, in which a liquid containing a flavoring material is wrapped with a film. The capsule 23 may have a circular or cylindrical shape, but is not limited thereto.

Referring to FIG. 5, the cigarette 3 includes additionally a front-end plug 33. The front-end plug 33 may be located on a side of the tobacco rod 31 facing the filter rod 32. The front-end plug 33 may prevent the tobacco rod 31 from escaping to the outside and may prevent a liquefied aerosol from flowing from the tobacco rod 31 into an aerosol generating device (1 of FIGS. 1 to 3) during smoking.

The filter rod 32 may include a first segment 321 and a second segment 322. Here, the first segment 321 may correspond to the first segment of the filter rod 22 of FIG. 4, and the second segment 322 may correspond to the third segment of the filter rod 22 of FIG. 4.

The diameter and the total length of the cigarette 3 may correspond to the diameter and the total length of the cigarette 2 of FIG. 4.

The cigarette 3 may be wrapped by at least one wrapper 35. At least one hole through which outside air flows in or inside gas flows out may be formed in the wrapper 35. For example, the front-end plug 33 may be wrapped by a first wrapper 241 351, the tobacco rod 31 may be wrapped by a second wrapper 352, the first segment 321 may be wrapped by by a third wrapper 353, and the second segment 322 may be wrapped by a fourth wrapper 354. Also, the entire cigarette 3 may be re-wrapped by a fifth wrapper 355.

Also, at least one perforation 36 may be formed in the fifth wrapper 355. For example, the perforation 36 may be formed in a region surrounding the tobacco rod 31, but is not limited thereto. The perforation 36 may serve to transfer heat generated by the heater 13 shown in FIGS. 2 and 3 into the tobacco rod 31.

Also, the second segment 322 may include at least one capsule 34. Here, the capsule 34 may serve to generate a flavor or serve to generate an aerosol. For example, the capsule 34 may have a structure in which a liquid containing perfume is wrapped in a film. The capsule 34 may have a spherical or cylindrical shape, but is not limited thereto.

Figure 6:
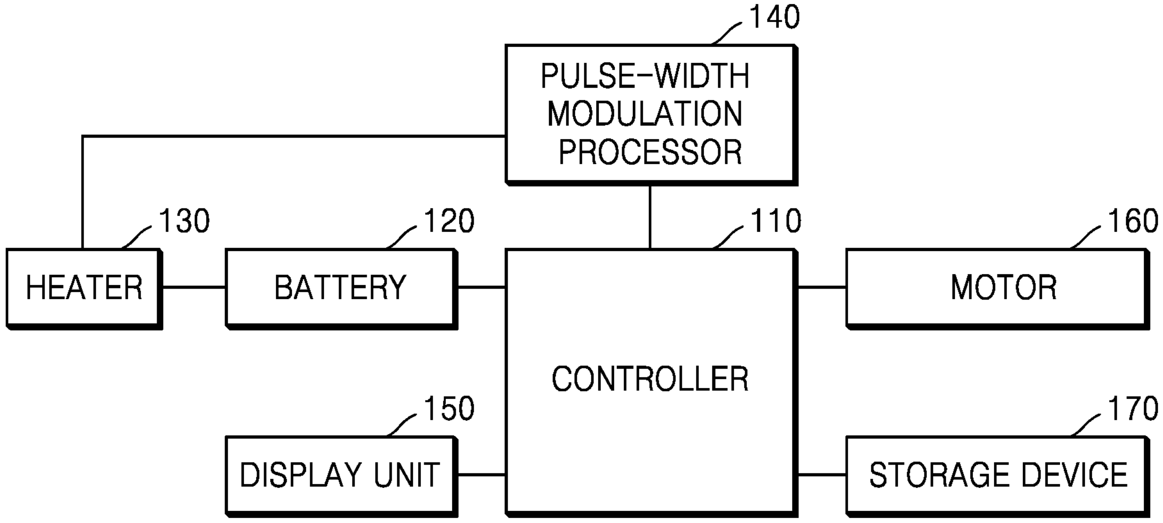
FIG. 6 is a diagram schematically showing a block diagram of an example of an aerosol generating device according to the present disclosure.

FIG. 6 is a diagram schematically illustrating a block diagram of an example of an aerosol-generating device according to the present invention.

Referring to FIG. 6, the aerosol-generating device according to the present invention may include a controller 110, a battery 120, a heater 130, a pulse width modulation processing unit 140, a display 150, a motor 160, and a storage device (170). Hereinafter, for convenience of description, the general functions of each component included in the aerosol generating device will be firstly described, and the operation of the control unit 110 according to the embodiment will be secondly described in detail.

The battery 120 supplies power to the heater 130, and an amount of power supplied to the heater 130 may be adjusted by the controller 110. According to an embodiment, a regulator may be included between the battery 120 and the controller 110 to maintain a constant voltage of the battery.

The controller 12 as a whole controls the battery 120, the heater 130, the pulse width modulation processing unit 140, the display 150, the motor 160, and the storage devices 170 included in the aerosol-generating device. Although not shown in FIG. 6, depending on an embodiment, the controller 110 may further include an input receiving unit (not shown) that receives a user's button input or touch input, and a communication unit (not shown) capable of communicating with an external communication device such as a user terminal. In addition, although not shown in FIG. 6, the controller 110 may further include a module for performing proportional integral differential control (PID) on the heater 130.

The heater 130 generates heat by an intrinsic resistance when a current is applied. When the aerosol-generating substrate is contacted to or is combined with the heated heater, aerosols may be generated.

The pulse width modulation processing unit 140 allows the controller 110 to control the power supplied to the heater 130 by transmitting PWM (Pulse Width Modulation) signals to the heater 130. Depending on an embodiment, the pulse width modulation processing unit 140 may be implemented to be included in the controller 110.

The PWM signal output from the pulse width modulation processing unit 140 may be a digital pulse width modulation signal.

The display 150 visually outputs various alarm messages generated by the aerosol-generating device 1 so that a user using the aerosol-generating device 10 may check the alarm messages. The user may check a battery power shortage message or a heater overheat warning message output to the display 150, and then may take appropriate measures before an operation of the aerosol-generating device stops or the aerosol-generating device is damaged.

The motor 160 is driven by the controller 110 so that the user may recognize that the aerosol-generating device is ready for use through tactile sense.

The storage device 170 stores various pieces of information to provide a consistent flavor to the user who uses the aerosol-generating device while appropriately controlling a power supplied to the heater 130 by the controller 110. The storage device 170 may not only be configured as a non-volatile memory, such as a flash memory, but also may be configured as a volatile memory that temporarily stores data only when power is supplied in order to secure a faster data input/output (I/O) speed. Hereinafter, the storage device 170 may be used interchangeably with the name of the storage unit 170 according to embodiments.

Hereinafter, operations of the controller 110 according to embodiments will be described in detail.

As an embodiment of the present disclosure, the storage unit 170 may store information regarding a first time period and a second time period, and when the first time period passes after the temperature of the heater 130 reaches a first target temperature, the controller 110 may change the temperature of the heater 130 to a second target temperature and maintain the second target temperature for the second time period.

Here, the first time period and the second time period that are information referred by the controller 110 for controlling the temperature of the heater indicates time periods in a particular range. As an example, the first time period may be two hundred and ten seconds, and the second time period may be sixty seconds. As the present disclosure does not limit units of the first time period and the second time period as particular units, according to embodiments, the storage unit 170 may store time periods, which are measured not by time, minute, and second but by other units, as the first time period and the second time period.

The controller 110 controls the power of the battery 120 to be supplied to the heater 130 and controls the temperature of the heater 130 to reach the first target temperature. A process in which the temperature of the heater 130 reaches the first target temperature may be understood to be identical to a process of warming up the heater that is well known in electric tobacco technologies. For example, the controller 110 may warm up the heater 130 for twenty seconds up to 330 degrees, that is, the first target temperature. Here, twenty seconds and 330 degrees are merely example dimensions, and thus, it is obvious that other time periods and temperature values may be used according to embodiments.

After the temperature of the heater 130 reaches the first target temperature, the controller 110 checks whether the first time period passes. Here, it is already explained that the first time period is information stored in the storage unit 170, and the controller 110 may include a timer (not shown 0 to check whether the first time period passes.

When the first time period passes after the temperature of the heater 130 reaches the first target temperature, the controller 110 changes the temperature of the heater 130 into the second target temperature and maintains the temperature for the second time period. Here, the second target temperature indicates a temperature when the first time period passes after the temperature of the heater 130 reaches the first target temperature and the temperature of the heater 130 continuously changes and is maintained for the second time period. Therefore, the second target temperature does not indicate a temperature when the temperature of the heater 130 reaches the first target temperature and then continuously changes according to in order to be changed into the second target temperature, but is defined as a temperature of the heater 130 when the controller 110 begins counting on passage of the second time period in a state where the temperature of the heater 130 stops being changed and the temperature is fixed. Here, the first target temperature and the second target temperature are information stored in advance in the controller 110 or the storage unit 170.

A sum of lengths of the first time period and the second time period stored in the storage unit 170 is a time period in a preset range. For example, when the first time period is two hundred seconds and the second time period is sixty seconds in the controller 110, the sum of lengths of the first time period and the second time period stored in the storage unit 170 is two hundred and sixty seconds. In the example as described above, the controller 110 maintains the temperature of the heater 130 for two hundred and sixty seconds, and more particularly, controls the temperature of the heater 130 to be maintained at the first target temperature for two hundred seconds and then maintained at the second target temperature for sixty second, thereby providing high smoking satisfaction to a user. According to embodiments, the storage unit 170 may store a third time period in addition to the first time period and the second time period, and the third time period may be defined as a time period for the temperature of the heater 130 to reach the first target temperature and then is changed into the second target temperature. According to the present embodiment, a sum from the first time period to the third time period may be a time period in a preset range.

As another selective embodiment, the sum of the first time period and the second time period may be greater than four minutes and less than five minutes. According to results of several times of experiments according to the present disclosure, a most stable and satisfactory smoking experience is provided when the sum of the first time period and the second time period is greater than four minutes and less than five minutes, and thus, the controller 110 may adjust properties of the aerosol generated from the aerosol generating device according to taste of a user by properly controlling the temperature of the heater 130 such that the sum of the first time period and the second time period is greater than four minutes and less than five minutes.

As another selective embodiment, a length of the first time period may be set to be greater than a length of the second time period. As described above, by setting the length of the second time period less than the length of the first time period, a properly processed aerosol may be provided to the user.

As an example opposite to the above-described example, the length of the second time period may be greater than the length of the first time period, or the length of the second time period may be equal to the length of the first time period. By adjusting the lengths of the first time period and the second time period, an amount of migration of nicotine and an amount of migration of glycerin exceeding a preset value may be secured in a specific section of the number of puffs.

As another selective embodiment different from the above-described example, a proportion of the length of the first time to the length of the second time period may be a constant value. As an example, when the length of the first time period is two hundred seconds and the length of the second time period is fifty seconds, a proportion of a length of the first time period to a length of the second time period is four, the controller 110 may fix the proportion, and when a value of any one of the first time period or the second time period is arbitrarily adjusted, may guide another time length, which is not adjusted, to be adjusted together.

As another embodiment different from the above-described example, the first target temperature may be lower than the second target temperature. As an example, the first target temperature may be equal to or higher than 315° C. and lower than or equal to 325° C., and the second target temperature may be equal to or higher than 325° C. and lower than or equal to 335° C. In the above-described case, the temperature of the heater 130 is warmed up and reaches the first target temperature, is maintained for the first time period, and then is changed into the second target temperature and is maintained for the second time period. Hereinafter, for convenience of explanation, a method in which the second target temperature is higher than the first target temperature is referred to as a continuous ascent control method.

As another embodiment different from the above-described example, the first target substrate may be higher than the second target temperature. As an example, the first target temperature may be equal to or higher than 325° C. and lower than or equal to 335° C., and the second target temperature may be equal to or higher than 310° C. and lower than or equal to 320° C. In the above-described case, the temperature of the heater 130 is warmed up, reaches the first target temperature and is maintained for the first time period, and then is changed into the second target temperature and is maintained for the second time period. Hereinafter, for convenience of explanation, a method in which the second target temperature is lower than the first target temperature is referred to as a continuous descent control method.

Figure 7:
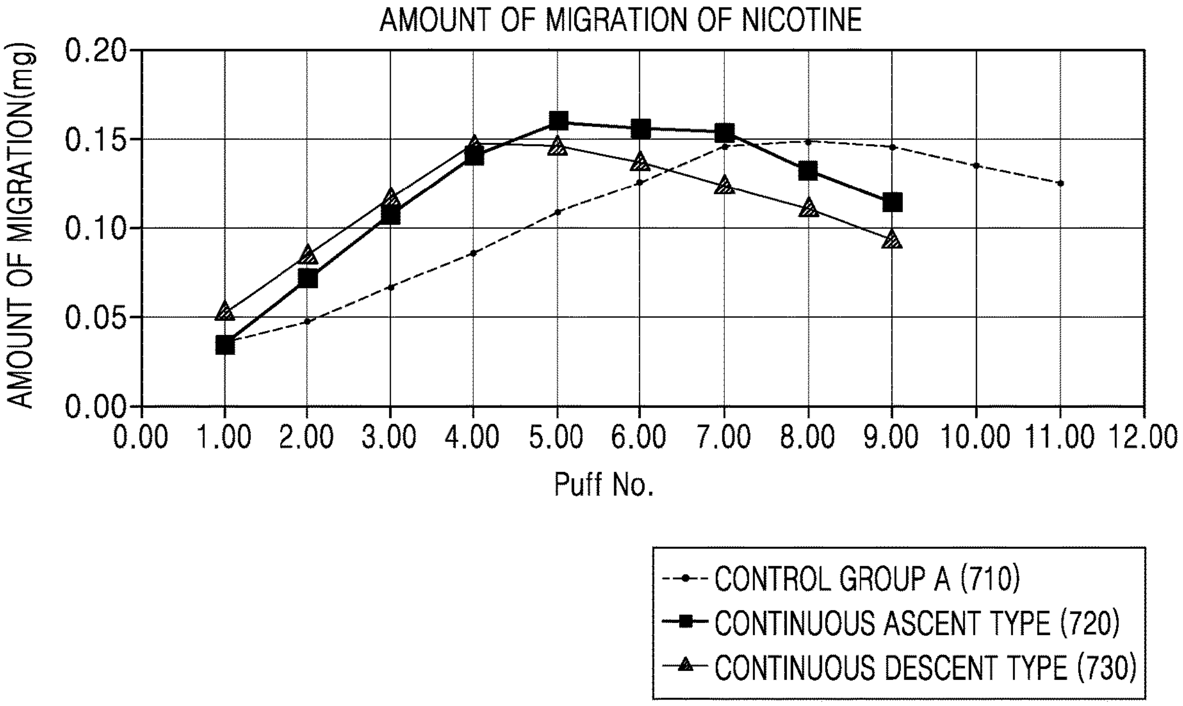
FIG. 7 is a graph showing an amount of migration of nicotine when a temperature of a heater is controlled according to the present disclosure.

FIG. 7 is a graph showing an amount of migration of nicotine when a temperature of a heater is controlled according to the present disclosure.

Referring to FIG. 7, it is shown that the amount of migration of nicotine tends to increase to a certain degree of the number of puffs as the user increases the number of puffs, and then gradually decreases.

First, a control group A 710 indicates a temperature control method of a heater of an aerosol generating device in the related art. Referring to FIG. 7, according to the control group A 710, it is shown that the amount of migration of nicotine is approximately 0.15 that is a greatest value when the number of puffs is seven to nine, and then gradually decreases. The control group A 710 is a method of setting a total heating period of the heater as six minutes and stops power supply to the heater 130 when the number of puffs by the user reaches twelve, according to a temperature control method of the heater of well-known aerosol generating devices in the related art.

Next, referring to FIG. 7, it is shown that the amount of migration of nicotine is approximate to a highest point when the number of puffs is four to six, according to the continuous ascent control method 720 or the continuous descent control method 730.

Particularly, comparing the control group A 710 to the continuous ascent control method 720 or the continuous descent control method 730, it is shown that the amount of migration of nicotine from a second puff to a sixth or seventh puff, which correspond to initial puffs when the temperature of the heater is controlled according to the continuous ascent control method 720 or the continuous descent control method 730, is greater than the amount of migration of nicotine when the temperature of the heater is controlled according to the control group A 710. Generally, it is known that an amount of migration of nicotine is directly related to a sense of stimulation from smoking, and urge for smoking is quickly resolved by a large amount of migration of nicotine, and therefore, by the control method according to the present disclosure, the user may quickly satisfy the urge for smoking only by several puffs.

Figure 8:
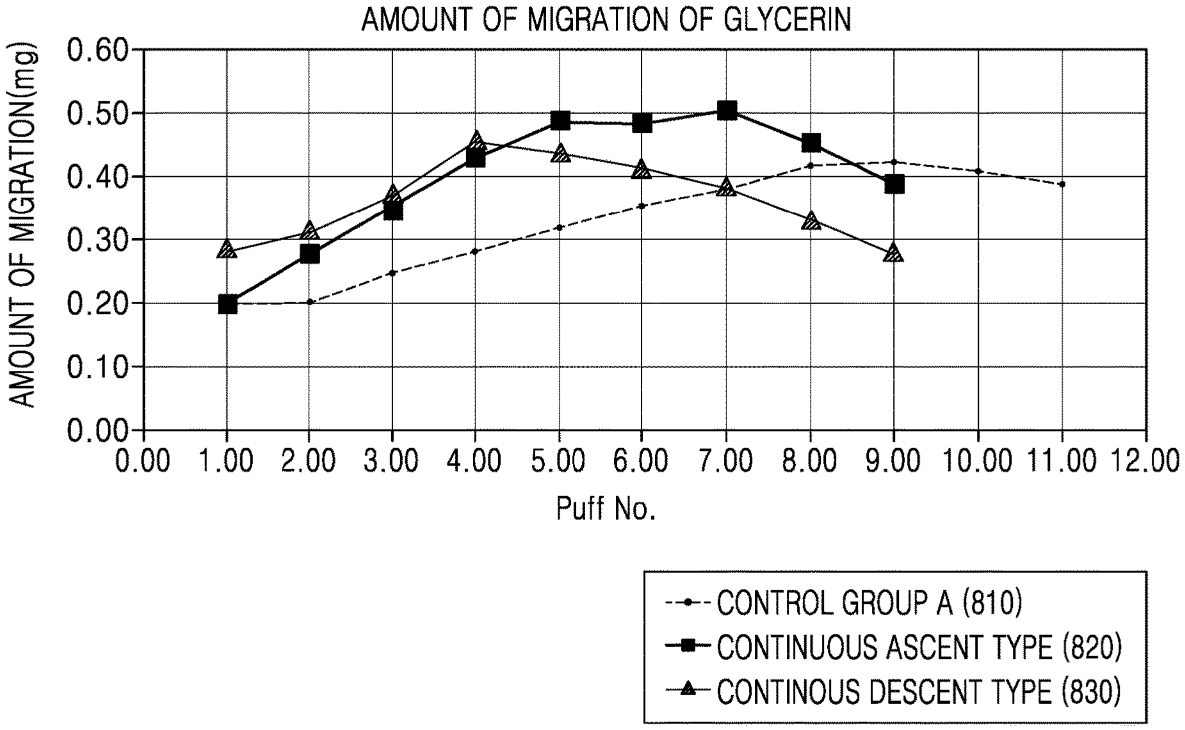
FIG. 8 is a graph showing an amount of migration of glycerin when a temperature of a heater is controlled according to the present disclosure.

FIG. 8 is a graph showing an amount of migration of glycerin when a temperature of a heater is controlled according to the present disclosure.

Referring to FIG. 8, it is shown that the amount of migration of glycerin tends to increase to a certain degree of the number of puffs, as the user smokes by using the aerosol generating device, and increase the number of puffs and then gradually decrease, like the amount of migration of nicotine.

First, a control group A 810 indicates a temperature control method of a heater of an aerosol generating device in the related art. Referring to FIG. 8, according to the control group A 810, it is shown that the amount of migration of nicotine is approximately 0.15 that is a greatest value when the number of puffs is eight to ten, and then gradually decreases. The control group A 810 uses a method of setting a total heating period of the heater as six minutes and stops power supply to the heater 130 when the number of puffs by the user reaches twelve, according to a temperature control method of the heater of well-known aerosol generating devices in the related art.

Next, referring to FIG. 8, it is shown that the amount of migration of glycerin is approximate to a highest point when the number of puffs is from four to six, according to the continuous ascent control method 820 and the continuous descent control method 830.

Particularly, comparing the control group A 810 to the continuous ascent control method 820 or the continuous descent control method 830, it is shown that the amount of migration of glycerin from a second puff to a sixth or seventh puff, which correspond to initial puffs when the temperature of the heater is controlled according to the continuous ascent control method 820 or the continuous descent control method 830, is greater than the amount of migration of the glycerin when the temperature of the heater is controlled according to the control group A 810. Generally, it is known that the amount of migration of glycerin is related to a smoke volume, and according to the control method of the present disclosure, the user may experience a fluent smoke volume.

Summarizing the results from FIGS. 7 and 8, when the temperature of the heater of the aerosol generating device is controlled according to the continuous ascent control method or the continuous descent control method, the user has a large amount of migration of nicotine and large amount of migration of glycerin in an initial puff section (from twice to seven times of puff) and therefore has a high stimulation from smoking and a fluent smoke volume. That is, when the stimulation from smoking and smoke volume are collectively referred to as smoking satisfaction, when the temperature of the heater is controlled by the method according to the present disclosure, high smoking satisfaction may be provided to the user compared to well-known methods in the related art. In addition, referring to FIGS. 7 and 8, it is shown that a larger amount of migration of nicotine and larger amount of migration of glycerin are produced by the continuous ascent control method than by the continuous descent control method.

According to the present disclosure, high smoking satisfaction may be provided to a user by a temperature control method capable of increasing an amount of migration of nicotine and an amount of migration of glycerin without need to consider the number of puffs by individual users. More particularly, the present disclosure does not realize high smoking satisfaction simply by limiting a heating time to a certain time range, but by combining patterns of temperature maintenance, temperature change, and temperature maintenance to a method of properly adjusting a maintenance time, thereby providing a high stimulus from smoking and smoke volume at an early state to a user who uses an aerosol generating device.

Figure 9:
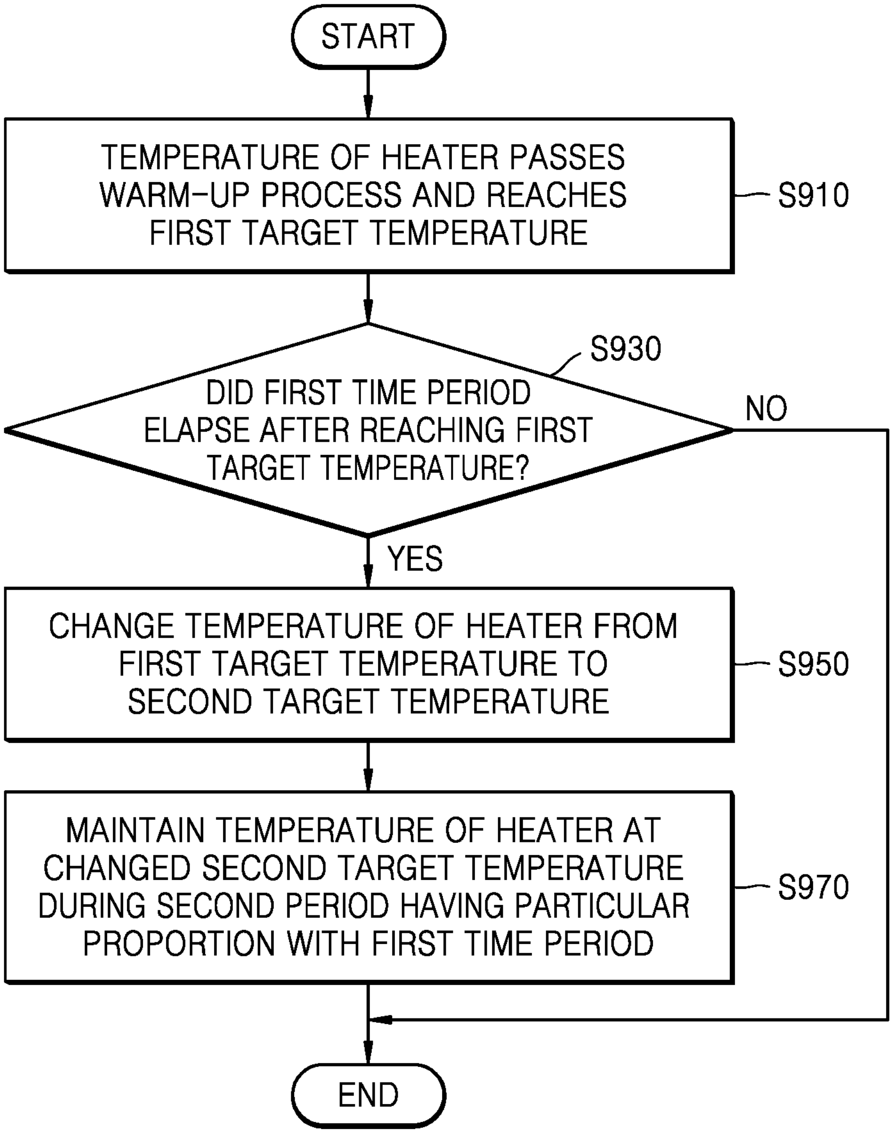
FIG. 9 is a diagram showing a flowchart of an example of a method of controlling a temperature of a heater of an aerosol generating device according to the present disclosure.

FIG. 9 shows a flowchart of an example of a method of controlling a temperature of a heater of an aerosol generating device according to the present disclosure.

The method according to FIG. 9 may be embodied by the aerosol generating device according to FIG. 6, and thus, the method will be described with reference to FIG. 6, and repeated description of the description of FIG. 6 will be omitted.

First, the controller 110 heats the heater 130 to the first target temperature (S910).

Next, the controller 110 determines whether the first time period passed after the temperature reached the first target temperature (S930).

The controller 110 changes the temperature of the heater 130 from the first target temperature to the second target temperature (S950).

The controller 110 maintains the second target temperature, which is obtained by changing the temperature of the heater 130, for the second time period that has a particular proportion to the first time period. Here, a combination of the first time period and the second time period having a particular proportion thereto are described above according to various embodiments. As an example, a sum of the first time period and a second time period may be in a preset range.

The embodiments of the present disclosure may be implemented in the form of a computer program which may be executed on a computer via various types of components, and such a computer program may be recorded on a computer-readable recording medium. The medium may include a magnetic medium such as a hard disk, a floppy disk, and a magnetic tape, an optical recording medium such as CD-ROM and DVD, a magneto-optical medium such as a floptical disk, and a hardware device specifically configured to store and execute program instructions, such as ROM, RAM, and flash memory.

The computer program is specifically designed and configured for the present disclosure but may be known to and used by one of ordinary skill in the computer software field. Examples of the computer program may include a high-level language code which may be executed using an interpreter or the like by a computer, as well as a machine language code such as that made by a complier.

The specific implementations described in the present disclosure are example embodiments and do not limit the scope of the present disclosure in any way. For brevity of the specification, descriptions of existing electronic configurations, control systems, software, and other functional aspects of the systems may be omitted. Connections of lines or connection members between components illustrated in the drawings illustratively show functional connections and/or physical or circuit connections and may be represented as alternative or additional various functional connections, physical connections, or circuit connections in an actual device. Unless specifically mentioned, such as "essential", "importantly", etc., the components may not be necessary components for application of the present disclosure.

As used herein (in particular, in claims), use of the term "the" and similar indication terms may correspond to both singular and plural. When a range is described in the present disclosure, the present disclosure may include the invention to which individual values belonging to the range are applied (unless contrary description), and each individual value constituting the range is the same as being described in the detailed description of the disclosure. Unless there is an explicit description of the order of the steps constituting the method according to the present disclosure or a contrary description, the steps may be performed in an appropriate order. The present disclosure is not necessarily limited to the description order of the steps. The use of all examples or example terms (for example, etc.) is merely for describing the present disclosure in detail, and the scope of the present disclosure is not limited by the examples or the example terms unless the examples or the example terms are limited by claims. It will be understood by one of ordinary skill in the art that various modifications, combinations, and changes may be made according to the design conditions and factors within the scope of the appended claims or equivalents thereof.

INDUSTRIAL APPLICABILITY

An embodiment of the present disclosure may be used for manufacturing a next-generation electric cigarette that is configured to control a temperature of a heater in a multi-stage manner.

The invention claimed is:

1. An aerosol generating device comprising:

a heater configured to generate an aerosol by heating an aerosol generating substrate;

a storage unit configured to store information regarding a first time period and a second time period for controlling a temperature of the heater;

a controller configured to control power supplied to the heater, wherein the controller is further configured to, based on the first time period elapsing after the temperature of the heater reaches a first target temperature, change the temperature of the heater to a second target temperature and then maintain the temperature of the heater at the second target temperature for the second time period, and a sum of the first time period and the second time period is a time period in a preset range.

2. The aerosol generating device of claim 1, wherein the sum of the first time period and the second time period is greater than four minutes and less than five minutes.

3. The aerosol generating device of claim 1, wherein a length of the first time period is greater than a length of the second time period.

4. The aerosol generating device of claim 1, wherein a length of the second time period is greater than a length of the first time period, or the length of the second time period is identical to the length of the first time period.

5. The aerosol generating device of claim 1, wherein a proportion of a length of the first time period to a length of the second time period is a constant value.

6. The aerosol generating device of claim 1, wherein the first target temperature is lower than the second target temperature.

7. The aerosol generating device of claim 6, wherein the first target temperature is equal to or higher than 315° C. and lower than or equal to 325° C., and the second target temperature is equal to or higher than 325° C. and lower than or equal to 335° C.

8. The aerosol generating device of claim 1, wherein the first target temperature is higher than the second target temperature.

9. The aerosol generating device of claim 8, wherein the first target temperature is equal to or higher than 325° C. and lower than or equal to 335° C., and the second target temperature is equal to or higher than 310° C. and lower than or equal to 320° C.

10. The aerosol generating device of claim 1, wherein the storage unit further stores information regarding a third time period, and the controller is further configured to, based on the temperature of the heater reaching the first target temperature and the first time period elapsing, change the temperature of the heater to the second target temperature over the third time period and maintain the second target temperature for the second time period, and a sum of the first time period, the second time period, and the third time period is a time period in a preset range.

11. A method of controlling a temperature of a heater of an aerosol generating device, the method comprising:

heating the heater to a first target temperature;

maintaining the temperature of the heated heater at the first target temperature for a first time period;

changing the temperature of the heater to a second target temperature based on the first time period elapsing; and maintaining the changed temperature of the heater at the second target temperature for a second time period, wherein a sum of the first time period and the second time period is a time period in a preset range.

12. The method of claim 11, wherein the sum of the first time period and the second time period is greater than four minutes and less than five minutes.

13. The method of claim 11, wherein a length of the first time period is greater than a length of the second time period.

14. The method of claim 11, wherein a proportion of a length of the first time period to a length of the second time period is a constant value.

15. The method of claim 11, wherein the first target temperature is lower than the second target temperature.

* * * * *